US009488732B1

(12) United States Patent
Doty

(10) Patent No.: US 9,488,732 B1
(45) Date of Patent: Nov. 8, 2016

(54) GPS OPTIMIZATION FOR LIMITED DATA

(71) Applicant: Rockwell Collins, Inc., Cedar Rapids, IA (US)

(72) Inventor: James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 641 days.

(21) Appl. No.: 13/949,399

(22) Filed: Jul. 24, 2013

(51) Int. Cl.
*G01S 19/25* (2010.01)

(52) U.S. Cl.
CPC .................................. *G01S 19/258* (2013.01)

(58) Field of Classification Search
CPC ...... G01S 19/25; G01S 19/258; G01S 19/39; G01S 19/01; G01S 19/15
USPC ............ 342/357.64, 357.22, 357.39, 357.53, 342/357.73
See application file for complete search history.

(56) References Cited

U.S. PATENT DOCUMENTS

| 6,324,474 B1* | 11/2001 | Beisner ................. G01S 19/07 342/357.31 |
| 6,570,531 B1* | 5/2003 | Stratton ................. G01S 19/15 342/357.53 |
| 2001/0020214 A1* | 9/2001 | Brenner ................. G01S 5/009 701/470 |
| 2013/0271318 A1* | 10/2013 | Doucet ................. G01S 19/25 342/357.64 |
| 2014/0062765 A1* | 3/2014 | Brenner ................. G01S 19/07 342/357.3 |

* cited by examiner

*Primary Examiner* — Harry Liu
(74) *Attorney, Agent, or Firm* — Angel N. Gerdzhikov; Donna P. Suchy; Daniel M. Barbieri

(57) ABSTRACT

A satellite navigation signal receiver connected to a legacy satellite navigation system receives a plurality of satellite signals. The receiver selects a subset of the plurality of signals and uses all available data from all of the signals to correct any errors in the subset of signals or otherwise increase the precision of the subset of signals. Alternatively, the receiver uses all of the available data in the plurality of signals to simulate idealized satellite signals that the legacy satellite navigation system uses to derive a location.

17 Claims, 6 Drawing Sheets

GPS OPTIMIZATION FOR LIMITED DATA

FIELD OF THE INVENTION

The present invention is directed generally toward satellite navigation, and particularly toward methods for increasing accuracy of legacy satellite navigation systems.

BACKGROUND OF THE INVENTION

Many older "legacy" tightly-coupled navigation systems are designed to use data from older Global Positioning System (GPS) cards having a limited number of output data channels (satellite measurements). These legacy navigation systems cannot use all of the rich set of data available from current high-capability all-in-view GPS or GNSS (Global Navigation Satellite Systems). Legacy satellite navigation systems are incorporated into aircraft avionics. Avionics systems are subject to strict regulation and testing, and are therefore inconvenient to replace.

The typical approach to supporting these systems to pick a subset of satellite vehicles that gives the best dilution of precision. This effectively throws away satellite data that could be used to improve the performance and robustness of the system Consequently, a technique is needed which can utilize all the data from a high-capability, multi-frequency, all-in-view GPS or GNSS navigation receiver but still be compatible with the limited capabilities of legacy navigation systems.

SUMMARY OF THE INVENTION

Accordingly, the present invention is directed to a novel method and apparatus for allowing a legacy navigation system to utilize all the data from a high-capability, multi-frequency, all-in-view GPS or GNSS navigation receiver.

In at least one embodiment of the present invention, a satellite navigation signal receiver connected to a legacy satellite navigation system receives a plurality of satellite signals. The receiver selects a subset of the plurality of signals and uses all available data from all of the signals to correct any errors in the subset of signals or otherwise increase the precision of the subset of signals.

In at least one embodiment of the present invention, a satellite navigation signal receiver connected to a legacy satellite navigation system receives a plurality of satellite signals. The receiver uses all of the available data in the plurality of signals to simulate idealized satellite signals that the legacy satellite navigation system uses to derive a location. The geometry of the idealized satellite signals produces improved dilution of precision.

Embodiments of the present invention produce measurements that are simplified and compatible with the legacy navigation system while improving the accuracy of pseudorange measurements by providing a small set of synthetically enhanced measurements that embody the performance of all-in-view receiver measurements.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
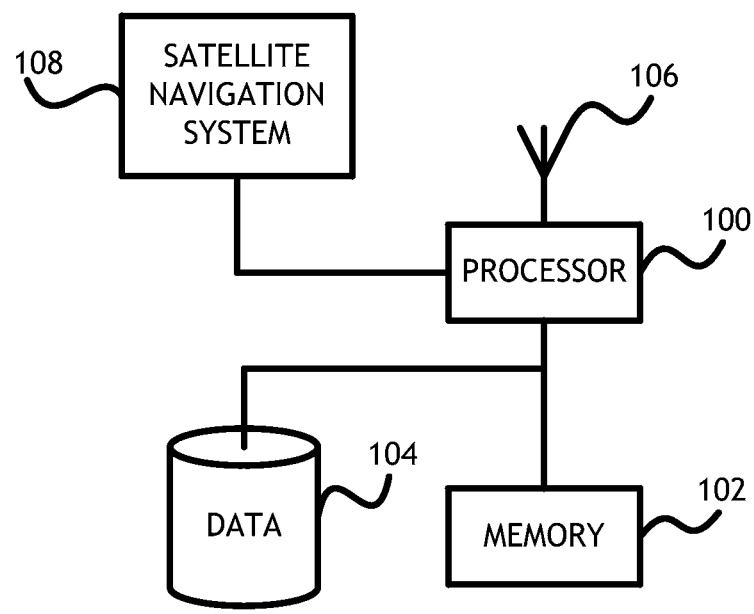
FIG. 1 shows a computer system suitable for implementing embodiments of the present invention.

Referring to FIG. 1, a computer system suitable for implementing embodiments of the present invention is shown. In at least one embodiment of the present invention, a computer system includes a processor 100 and memory 102 connected to the processor 100. The processor 100 is configured to execute computer executable program code to process signals received form a plurality of navigation satellites. The processor 100 receives signals through a connected satellite antenna 106. Processing may require additional data external to the satellite signals; such additional data may be stored in a data storage element 104 connected to the processor 100. The processor 100 may send a signal processed according to the present invention to a satellite navigation system 108. In at least one embodiment, the satellite navigation system 108 is a legacy system only capable of receiving signals from some subset of the available satellites, or only one set of frequencies from the available satellites. Furthermore, embodiments of the present invention may be implemented in GPS receiver software to adapt high-capability all-in-view receivers to legacy satellite navigation systems.

Figure 2:
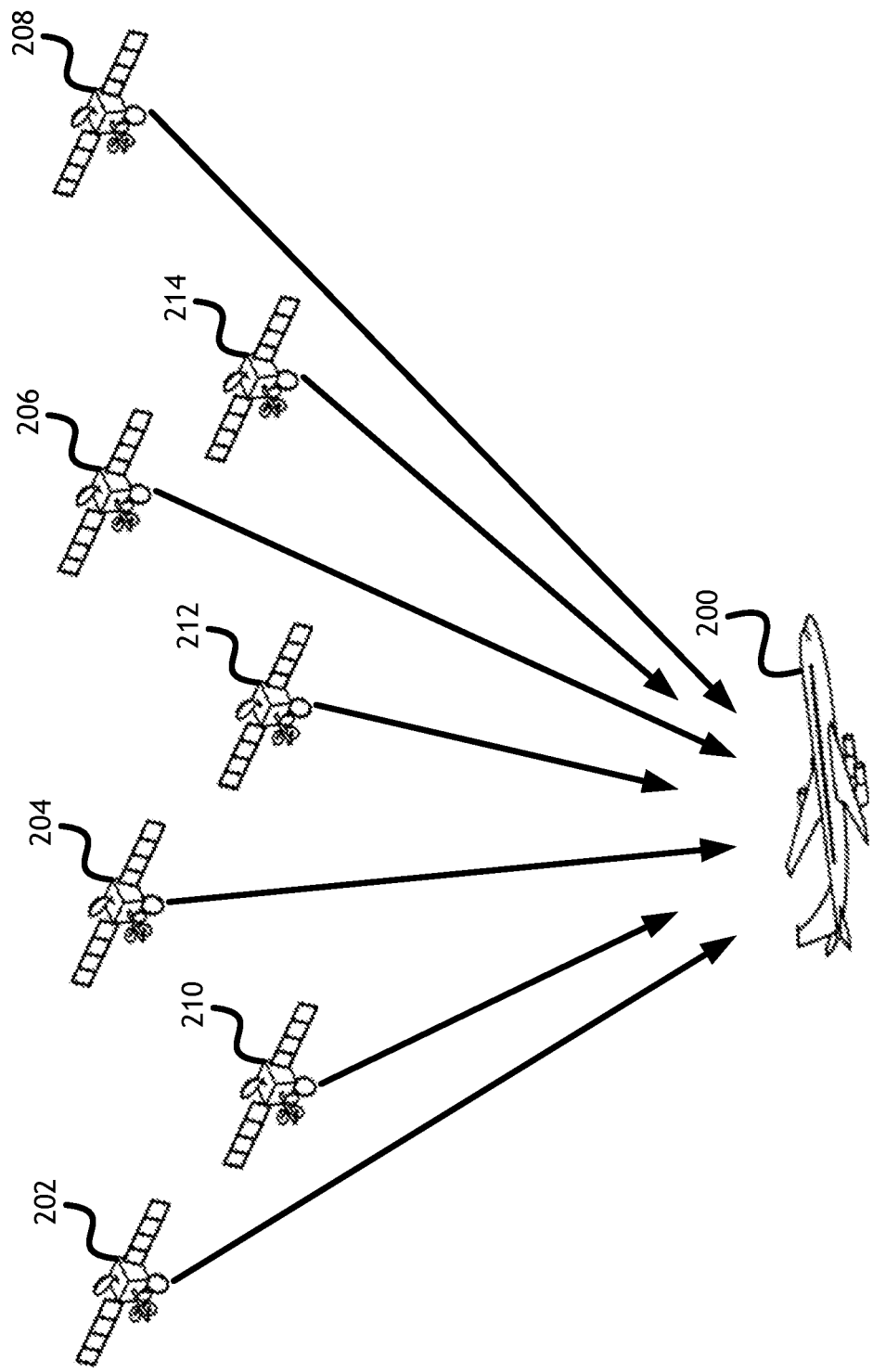
FIG. 2 shows an environmental representation of a global navigation satellite system.

Referring to FIG. 2, an environmental representation of a global navigation satellite system is shown. The satellites giving the geometry for best dilution of precision are enhanced to reduce noise, correct ionospheric errors, and provide data even if a frequency band is jammed. Actual satellite numbers and positions are used in case they are forwarded, by a satellite navigation system, to other systems that may have independent almanac or ephemeris data. Measurement uncertainty output may be generated to reflect the constellation noise and uncertainty in the direction of the enhanced satellites.

In one embodiment of an existing system for use with a legacy avionics system, an aircraft 200 receives a plurality of satellite navigation signals from a plurality of satellites 202, 204, 206, 208, 210, 212, 214. An on-aircraft 200 satellite navigation system may be configured to utilize signals from only a subset of the plurality of satellites 202, 204, 206, 208, 210, 212, 214. In that case, the on-aircraft 200 satellite navigation system would traditionally select a subset of the satellites 202, 204, 206, 208, 210, 212, 214 and discard the signals from any unused satellites 202, 204, 206, 208, 210, 212, 214. For example, the on-aircraft 200 satellite navigation system may select signals from a first set of satellites 210, 212, 214 and may discard signals from a second set of satellites 202, 204, 206, 208. The on-aircraft 200 satellite navigation system may select which signals to keep and which to discard based on the strength of such signals, the advantageous orientation of the first set of satellites 210, 212, 214 or other factors known in the art.

In one embodiment of the present invention, an on-aircraft 200 receiver may utilize location data derived from all of the satellites 202, 204, 206, 208, 210, 212, 214 signals. More satellite 202, 204, 206, 208, 210, 212, 214 signals allow for more precise location calculations and smaller error factors. Once the location of the aircraft 200 is determined using all of the available satellite 202, 204, 206, 208, 210, 212, 214 signals, the on-aircraft 200 receiver may enhance signals associated with the first set of satellites 202, 204, 206, 208 and transfer the enhanced signals to the on-aircraft 200 satellite navigation system.

In one embodiment, enhancing the first set of satellite 210, 212, 214 signals may comprise determining an error factor based on all of the satellite 202, 204, 206, 208, 210, 212, 214 signals and correcting the error factor in the first set of satellite 210, 212, 214 signals. In another embodiment, enhancing the first set of satellite 210, 212, 214 signals may comprise determining synthetic, idealized signals based on the known location of the aircraft 200 and the known locations of the first set of satellites 202, 204, 206, 208. In at least one embodiment, each satellite 202, 204, 206, 208, 210, 212, 214 may produce more than one signal. For example, in a GPS system, each satellite 202, 204, 206, 208, 210, 212, 214 may produce signals L1, L2 and L5. A legacy system may only use one signal from each satellite 202, 204, 206, 208, 210, 212, 214, in which case an on-aircraft satellite navigation system may use some of the available signals, such as L2 and L5, to enhance one signal L1. The enhanced signal L1 allows for greater accuracy because of additional measurement and frequency diversity to produce ionospheric corrections and allow for continued measurements when one frequency is jammed.

In some cases, the on-aircraft 200 satellite navigation system may need to relay individual signals from the first set of satellites 210, 212, 214 to other systems or re-transmit such signals. In such case, the relayed signals, while enhanced, remain consistent with the unenhanced signals actually transmitted by the first set of satellites 210, 212, 214. For example, the relayed signal may include ephemeris data of the original satellite signals but correct errors in the pseudorange measurements of the satellites.

Embodiments of the present invention may be used to add multi-constellation capability to single-constellation systems. Signals from a secondary constellation (for example Galileo) may be used to augment or replace primary constellation signals (for example GPS) if primary signals are not available. Embodiments of the present invention may also be used to adapt commercial tightly coupled navigation systems from GPS-only to multi-constellation GNSS.

Figure 3:
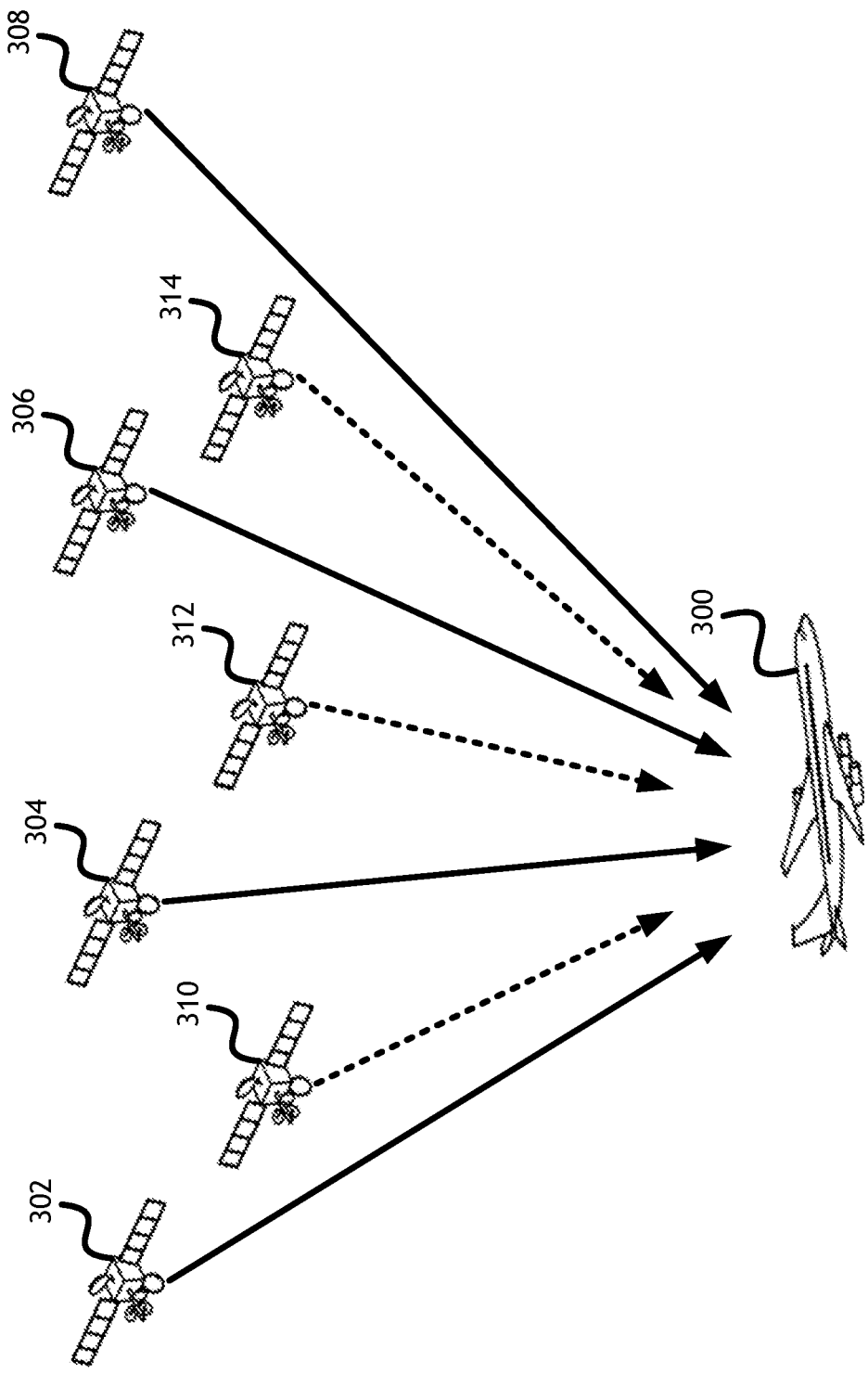
FIG. 3 shows an environmental representation of one embodiment of the present invention.

Referring to FIG. 3, an environmental representation of one embodiment of the present invention is shown. An idealized set of measurements for example are generated with a corresponding false position to give the best geometry for the given number of satellites; for example three satellites near the visible horizon one hundred twenty degrees apart and one directly overhead. In the context of the present invention, "visible horizon" may be understood to refer to satellites positioned above the physical horizon so as to be useable by an aircraft satellite navigation system; an aircraft satellite navigation system may include a mask elevation angle limitation wherein satellites are only used if they are a minimum angle above the physical horizon, in which case satellites near the "visible horizon" refers to satellites above the mask elevation angle. Furthermore, measurement uncertainty output may be generated to reflect constellation noise and uncertainty in the direction of the synthetic satellites.

In at least one embodiment of the present invention, an aircraft 300 receives a plurality of satellite navigation signals from a plurality of real satellites 302, 304, 306, 308. An on-aircraft 300 receiver may be configured to utilize signals from the plurality of real satellites 302, 304, 306, 308 to produce a plurality of idealized satellite 310, 312, 314 signals. In that case, the on-aircraft 300 satellite navigation system would utilize all available real satellite 302, 304, 306, 308 signals to derive idealized satellite 310, 312, 314 signals corresponding to non-existing satellites in ideal locations for a satellite navigation system to derive the location of the aircraft 300. For example, the plurality of idealized satellite 310, 312, 314 signals may represent satellites 310, 312, 314 at the horizon visible from the aircraft 300, separated by ninety degrees, and a satellite 310, 312, 314 directly above the aircraft 300.

Figure 4:
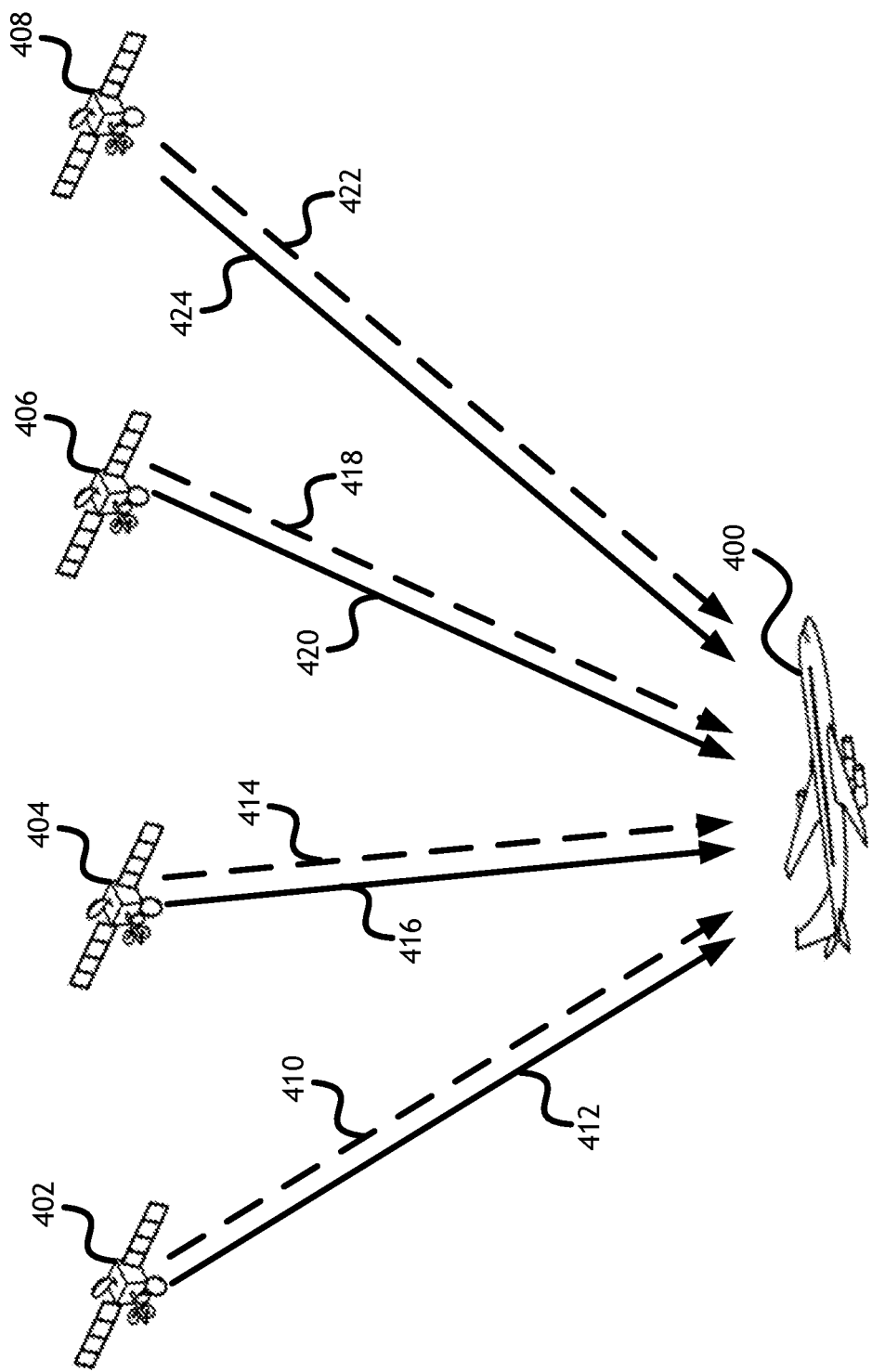
FIG. 4 shows an environmental representation of one embodiment of the present invention.

Referring to FIG. 4, an environmental representation of one embodiment of the present invention is shown. Embodiments may be used to add multi-frequency performance to single frequency navigation systems. In at least one embodiment of the present invention, an aircraft 400 receives a plurality of satellite navigation signals from a plurality of satellites 402, 404, 406, 408, each transmitting signals on multiple frequencies 410, 412, 414, 416, 418, 420, 422, 424. An on-aircraft 400 receiver may be configured to utilize signals from multiple frequencies 410, 412, 414, 416, 418, 420, 422, 424 to produce a single, enhanced signal associated with each satellite 402, 404, 406, 408 and send such enhanced signal to an on-board aircraft 400 satellite navigation system configured to receive a single in only a single frequency for each satellite 402, 404, 406, 408. Secondary frequencies may be used to synthesize signals when the primary band is jammed.

In one embodiment of the present invention, an on-aircraft 400 receiver may receive a signal in a first frequency 410 and a signal in a second frequency 412 from a first satellite 402; likewise, the receiver may receive signals in corresponding first frequencies 414, 418, 422 and second frequencies 416, 420, 424 from additional satellites 404, 406, 408. The receiver may use data from each signal frequency 410, 412, 414, 416, 418, 420, 422, 424 to derive the location of the aircraft 400. The receiver may produce one or more enhanced signals, each of the one or more enhanced signals corresponding to a satellite 402, 404, 406, 408. The one or more enhanced signals may comprise one of the first frequency 410, 414, 418, 422 signals or second frequency 412, 416, 420, 424 signals, enhanced to correct one or more error factors. Alternatively, the receiver may derive a false signal corresponding to each satellite 402, 404, 406, 408 based on the first frequency 410, 414, 418, 422 and second frequency 412, 416, 420, 424 associated with each satellite. Multiple frequencies (for example L1, L2, L5) may be used to correct for ionospheric errors, improve noise performance, and provide data when one frequency is jammed.

Figure 5:
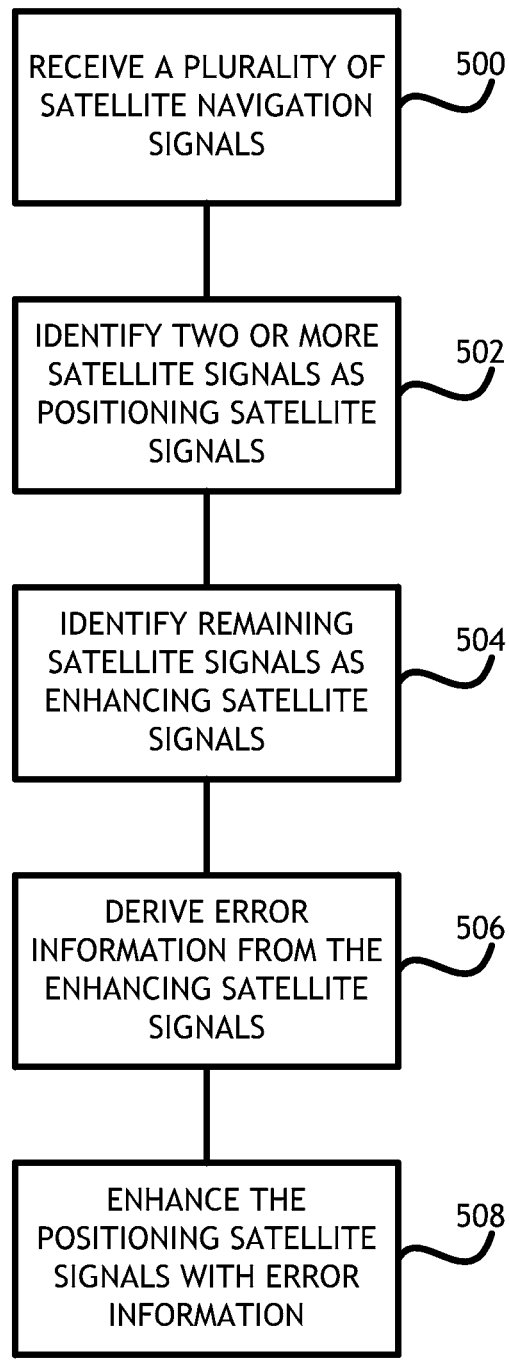
FIG. 5 shows a flowchart of one embodiment of the present invention.

Referring to FIG. 5, a flowchart of one embodiment of the present invention is shown. In at least one embodiment, where a receiver is configured to relay actual satellite signals to a legacy satellite navigation system, the receiver receives 500 a plurality of satellite navigation signals. The legacy satellite navigation system may only be able to accommodate a subset of the total plurality of satellites such that the receiver may identify 502 a subset of satellite signals as positioning satellite signals. The subset of satellite signals may be defined by the capabilities of the legacy satellite navigation system, the subset of satellites having the most advantageous orientations or other factors relevant to satellite navigation. The receiver may then identify 504 the remaining satellite signals as enhancing satellite signals. Based on the positioning signals and enhancing signals, the receiver may derive 506 error information corresponding to an error factor associated with the satellite signals. The error information may be used to enhance 508 the positioning satellite signals. Enhancing may refer to correcting one or more errors, replicating an idealized representation of the positioning signal or other corrective action based on the particular error information.

Figure 6:
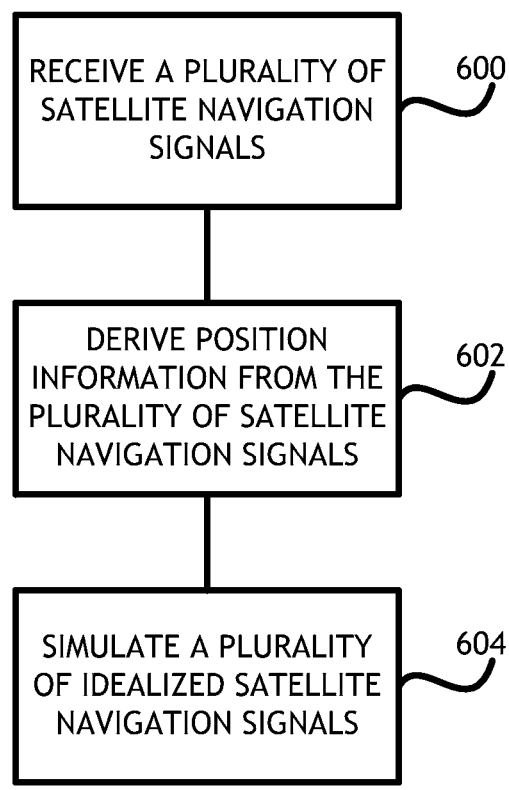
FIG. 6 shows a flowchart of one embodiment of the present invention.

Referring to FIG. 6, a flowchart of one embodiment of the present invention is shown. In at least one embodiment, a receiver may receive 600 a plurality of satellite navigation signals and derive 602 a location based on the plurality of satellite navigation signals. The receiver may then simulate 604 a plurality of idealized satellite navigation signals. Idealized satellite navigation signals may represent signals from a set of satellites compatible with capabilities of a legacy satellite navigation system. For example, where a legacy satellite navigation system is only capable of utilizing signals from five satellites, the receiver simulate 604 four signals from non-existent satellites oriented along the visible horizon relative to the aircraft and separated by ninety degrees, and one satellite directly overhead.

In at least one embodiment of the present invention, "receiver" may be understood to refer to a GPS card or other global satellite signal receiving apparatus.

Embodiments of the present invention utilize all the rich set of data generated by a high-capability receiver to generate a data output compatible with older navigation systems, but is more accurate and more robust than traditional best dilution of precision approach.

The drawings and example described herein are intended to be illustrative of the concepts embodied in the present invention. The numbers of satellites and satellite signals specified should not be considered limiting. Furthermore, the types of signals described are illustrative in nature; the systems and methods described herein may utilize multiple frequencies and multiple signals in each frequency emanating from each satellite. The number of satellites, numbers of frequencies, number of signals and even number of global navigation satellite systems have been arbitrarily limited for clarity. Also, additional systems and navigational sources may be incorporated to further correct errors and increase accuracy.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of providing enhanced satellite navigation signals to a satellite navigation system, comprising:
   receiving a plurality of satellite navigation signals, each of the plurality of satellite navigation signals being part of a global navigation satellite system;
   determining one or more limitations of the satellite navigation system;
   analyzing the plurality of satellite navigation signals by determining a location based on the plurality of satellite navigation signals;
   producing a set of enhanced signals from the plurality of satellite navigation signals, independent of any enhanced information from a ground station, by determining an idealized satellite geometry based on the one or more limitations of the satellite navigation system and simulating one or more idealized satellite navigation signals based on the idealized satellite geometry, the set of enhanced signals conforming to the one or more limitations of the satellite navigation system; and
   relaying the set of enhanced signals to the satellite navigation system.

2. The method of claim 1, wherein:
   analyzing the plurality of satellite navigation signals comprises:
      identifying a positioning subset of the plurality of satellite navigation signals, the positioning subset conforming to the one or more limitations of the satellite navigation system;
      identifying an enhancing subset of the plurality of satellite navigation signals comprising all of the satellite navigation signals not within the positioning subset; and
      determining one or more corrective factors based on measurements derived from at least one satellite signal in the enhancing subset; and
   producing the set of enhanced signals comprises applying the one or more corrective factors to at least one satellite signal in the positioning subset.

3. The method of claim 2, wherein the plurality of satellite navigation signals comprises signals from at least two distinct global navigation satellite systems.

4. The method of claim 2, wherein:
   the positioning subset comprises satellite navigation signals in a first frequency band; and
   the enhancing subset comprises satellite navigation signals in a second frequency band.

5. The method of claim 1, wherein the plurality of satellite navigation signals comprises signals from at least two distinct global navigation satellite systems.

6. A compute apparatus, installed in an aircraft, comprising:
   a processor;
   memory connected to the processor for storing computer executable program code;
   an antenna connected to the processor, the antenna configured to receive a plurality of satellite navigation signals; and
   computer executable program code configured to execute on the processor,
   wherein the computer executable program code is configured to:
      receive a plurality of satellite navigation signals through the antenna;
      determine one or more limitations of a satellite navigation system;
      analyze the plurality of satellite navigation signals by determining a location based on the plurality of satellite navigation signals; and
      produce a set of enhanced satellite navigation signals from the plurality of satellite navigation signals, independent of any enhanced information from a ground station, by determining an idealized satellite geometry based on the one or more limitations of the satellite navigation system and simulating one or more idealized satellite navigation signals based on the idealized satellite geometry, the set of enhanced satellite navigation signals conforming to the one or more limitations of the satellite navigation system.

7. The computer apparatus of claim 6, wherein:
analyzing the plurality of satellite navigation signals comprises:
  identifying a positioning subset of the plurality of satellite navigation signals, the positioning subset conforming to the one or more limitations of the satellite navigation system;
  identifying an enhancing subset of the plurality of satellite navigation signals comprising all of the satellite navigation signals not within the positioning subset; and
  determining one or more corrective factors based on measurements derived from at least one satellite signal in the enhancing subset; and
producing the set of enhanced signals comprises applying the one or more corrective factors to at least one satellite signal in the positioning subset.

8. The computer apparatus of claim 7, wherein the plurality of satellite navigation signals comprises signals from at least two distinct global navigation satellite systems.

9. The computer apparatus of claim 7, wherein:
the positioning subset comprises satellite navigation signals in a first frequency band; and
the enhancing subset comprises satellite navigation signals in a second frequency band.

10. The computer apparatus of claim 6, wherein the plurality of satellite navigation signals comprises signals from at least two distinct global navigation satellite systems.

11. The computer apparatus of claim 6, wherein the idealized satellite geometry comprises:
a two more satellites substantially at a horizon, equidistantly spaced from each other by a separation angle; and
one satellite offset from each of the two or more satellites by substantially ninety degrees relative to a receiver.

12. An aircraft avionics system comprising:
a satellite navigation signal receiver, in an aircraft, comprising:
  a processor;
  memory connected to the processor for storing computer executable program code;
  an antenna connected to the processor, the antenna configured to receive a plurality of satellite navigation signals; and
  computer executable program code configured to execute on the processor; and
a satellite navigation system in an aircraft,
wherein the computer executable program code is configured to:
  receive a plurality of satellite navigation signals through the antenna;
  determine one or more limitations of the satellite navigation system;
  analyze the plurality of satellite navigation signals by determining a location based on the plurality of satellite navigation signals;
  produce a set of enhanced satellite navigation signals from the plurality of satellite navigation signals, independent of any enhanced information from a ground station, by determining an idealized satellite geometry based on the one or more limitations of the satellite navigation system and simulating one or more idealized satellite navigation signals based on the idealized satellite geometry, the set of enhanced satellite navigation signals conforming to the one or more limitations of the satellite navigation system; and
  relay the set of enhanced signals to the satellite navigation system.

13. The aircraft avionics system of claim 12, wherein:
analyzing the plurality of satellite navigation signals comprises:
  identifying a positioning subset of the plurality of satellite navigation signals, the positioning subset conforming to the one or more limitations of the satellite navigation system;
  identifying an enhancing subset of the plurality of satellite navigation signals comprising all of the satellite navigation signals not within the positioning subset; and
  determining one or more corrective factors based on measurements derived from at least one satellite signal in the enhancing subset; and
producing the set of enhanced signals comprises applying the one or more corrective factors to at least one satellite signal in the positioning subset.

14. The aircraft avionics system of claim 13, wherein the plurality of satellite navigation signals comprises signals from at least two distinct global navigation satellite systems.

15. The aircraft avionics system of claim 13, wherein:
the positioning subset comprises satellite navigation signals in a first frequency band; and
the enhancing subset comprises satellite navigation signals in a second frequency band.

16. The aircraft avionics system of claim 12, wherein the plurality of satellite navigation signals comprises signals from at least two distinct global navigation satellite systems.

17. The aircraft avionics system of claim 12, wherein the idealized satellite geometry comprises:
a two more satellites substantially at a horizon, equidistantly spaced from each other; and
one satellite offset from each of the two or more satellites by substantially ninety degrees relative to a receiver.

* * * * *